(12) United States Patent
Ichikawa et al.

(10) Patent No.: US 7,724,402 B2
(45) Date of Patent: May 25, 2010

(54) IMAGE READER

(75) Inventors: Hirokazu Ichikawa, Kanagawa (JP);
Fumio Nakaya, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1151 days.

(21) Appl. No.: 11/343,203

(22) Filed: Jan. 31, 2006

(65) Prior Publication Data
US 2007/0177233 A1    Aug. 2, 2007

(51) Int. Cl.
*H04N 1/04* (2006.01)
(52) U.S. Cl. ............... 358/474; 358/475; 358/494; 358/497
(58) Field of Classification Search .......... 358/474, 358/475, 494, 497
See application file for complete search history.

(56) References Cited
U.S. PATENT DOCUMENTS
7,209,267 B2 *  4/2007  Stocker .................. 358/474

FOREIGN PATENT DOCUMENTS
JP    A-2003-132350    5/2003

\* cited by examiner

*Primary Examiner*—Houshang Safaipour
(74) *Attorney, Agent, or Firm*—Morgan, Lewis & Bockius LLP

(57) ABSTRACT

An image reader includes an illumination unit that irradiates an object to be read with light, a first optical system that allows a first reflection light from the object to be read advance therein, a second optical system that allows a second reflection light from the object to be read to advance therein, a switching unit that switches between the first optical system and the second optical system to be used, an imaging unit that forms an image of the first reflection light that advances in the first optical system and an image of the second reflection light that advances in the second optical system by switching between the first optical system and the second optical system by the switching unit, and a light receiving unit that receives the first reflection light and the second reflection light which are formed into images and generates respective image signals.

20 Claims, 6 Drawing Sheets

IMAGE READER

BACKGROUND OF THE INVENTION

1. Field of the Invention

The present invention relates to a technique which captures information on texture of an original and reproduces the information in an image reader.

2. Description of the Related Art

Surfaces of objects respectively have "textures". For example, a surface of polished metal gives "glossiness" to a viewer, while a surface of cloth or a fabric gives glossless "matte feeling" to a viewer. To express an object with more reality like an actual object, it is necessary to capture information on texture (texture information) such as gloss and feeling (external appearance and touch) of the actual object and reproduces the texture information. Accordingly, in an image reader of a scanner, a copying machine or the like, an attempt has been made to read not only the color information of an object but also the texture information of the object.

The texture of the object depends mainly on a reflection condition of light on a surface of the object. In general, the reflection light on the surface of the object is composed of a specular reflection light (or mirror reflection light) having high directivity and a diffuse reflection light having low directivity, wherein the texture of the object differs depending on a ratio between these lights. For example, the ratio of the specular reflection light is relatively high on the surface of the polished metal and hence, the glossiness is imparted to the surface of the metal. On the other hand, on the surface of the glossless object such as cloth or fabric, the ratio of the diffuse reflection light is relatively high. That is, the acquisition of ratio between the specular reflection light and the diffuse reflection light by measuring the reflection light from the surface of the object leads to the faithful expression of the texture of the object, more particularly, the degree of gloss level.

In the image reader, the object which constitutes an original is read using the diffuse reflection light. That is, in the image reader, the reflection light containing a large amount of diffuse reflection light from the original is received, and color information of the object is generated based on the diffuse reflection light. On the other hand, when the image reader is configured such that the reflection light which contains a large amount of specular reflection light from the original is received, there may be a case in which the specular reflection light component becomes excessively large depending on a surface condition of the original and the color reading performance of the original image based on the diffuse reflection light is lowered. Accordingly, an imaging optical system is designed such that the specular reflection light from the original is minimized so that the reflection light containing the diffuse reflection light as much as possible is received.

On the other hand, to read the texture of the surface of the original, the image reader may be configured such that both of the diffuse reflection light and the specular reflection light from the original are received, and the color information and the texture information are obtained based on the respective reflection light components. For example, a technique has been known in which an image mainly containing the diffuse reflection light (the diffuse reflection image) is read by light emitted from a light source to an object to be copied (original), an image mainly containing the specular reflection light (mirror-surface reflection image) is read by light emitted from another light source to the object to be copied, and a gloss signal which indicates the gloss is generated based on these image signals. That is, in this technique, color information of the object to be copied is obtained based on the diffuse reflection light, and the texture information of the object to be copied is obtained based on the specular reflection light.

However, the acquisition of texture information of the surface of the original using this technique gives rise to the following drawbacks.

In the above technique, the optical system contains two different illumination units, an illumination unit (light source) for obtaining the diffuse reflection light and another illumination unit (light source) for obtaining the specular reflection light. Accordingly, the configuration for illuminating the original becomes large-sized and pushes up a cost. Further, these illumination units take different reading positions and hence, in overlapping images obtained by the reflection lights, that is, in overlapping the diffuse reflection image and the specular reflection image, it is necessary to correct the position of image signals using a memory or the like corresponding to the shifted positions of the diffuse reflection image and the specular reflection image.

Further, in the above-mentioned configuration, since an optical path length of the reflection light for reading the diffuse reflection light and an optical path length of the reflection light for reading the specular reflection light are not the same and hence, unless any measures are taken, at least one reflection light is received without being properly focused as an image. Accordingly, to allow the reflection lights to perform the proper imaging, it is necessary to perform the adjustment of focusing points of the reflection lights each time, and to perform the reading operation of the original twice.

SUMMERY OF THE INVENTION

The present invention has been made in view of the above circumstances and provides a technique which enables the acquisition of the texture information more easily and rapidly.

According to an aspect of the present invention, the image reader includes an illumination unit that irradiates an object to be read with light; a first optical system that allows a first reflection light from the object to be read to advance therein; a second optical system that allows a second reflection light from the object to be read to advance therein; a switching unit that switches between the first optical system and the second optical system to be used; an imaging unit that forms an image of the first reflection light that advances in the first optical system and an image of the second reflection light that advances in the second optical system by the switching between the first optical system and the second optical system by the switching unit; and a light receiving unit that receives the first reflection light and the second reflection light which are formed into images by the imaging unit and generates respective image signals.

BRIEF DESCRIPTION OF THE DRAWING

Embodiments of the present invention will be described in detail based on the following figures, wherein.

DETAILED DESCRIPTION OF THE INVENTION

Hereinafter, the present invention is explained in detail based on embodiments with reference to attached drawings.

An image reader of the present invention includes an optical system (mirrors), where a first reflection light and a second reflection light from an original which is irradiated with light from a single illumination unit (a light source) are finally led to the same optical path, and the first reflection light and the second reflection light are received by the same light receiving unit (linear image sensor). Due to such a configuration, the image reader of the present invention can acquire the texture information more easily compared to a conventional image reader. Further, according to the present invention, the above-mentioned first reflection light and second reflection light are captured as a synthesized reflection light and the synthesized reflection light is read by a single reading operation and hence, the texture information can be acquired more rapidly than the conventional image reader. Hereinafter, the present invention is explained in detail in conjunction with several embodiments.

First Embodiment

Figure 1:
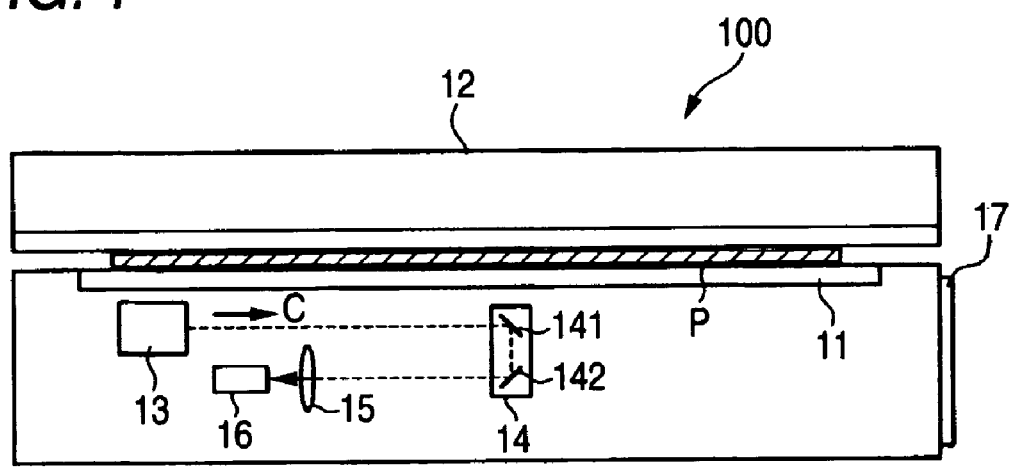
FIG. 1 is a view showing the device configuration of an image reader according to a first exemplary embodiment of the present invention.

FIG. 1 is a view showing the device configuration of an image reader 100 according to a first exemplary embodiment of the present invention. As shown in the figure, the image reader 100 includes a platen glass 11, a platen cover 12, a full rate carriage 13, a half rate carriage 14, an imaging lens 15, a linear image sensor 16 and a operation part 17.

The platen glass 11 is formed of a transparent glass plate on which an original P to be read is placed. On both surfaces of the platen glass 11, antireflection layer formed of dielectric multilayer coating or the like, for example, is formed thus reducing the reflection of light on surfaces of the platen glass 11. The platen cover 12 is provided in a state that the platen cover 12 covers the platen glass 11 and blocks an external light so as to facilitate the reading of the original P placed on the platen glass 11.

The original P is not limited to paper and may be formed of a plastic sheet such as an OHP sheet, a metal plate, a cloth or a fabric.

Figure 2:
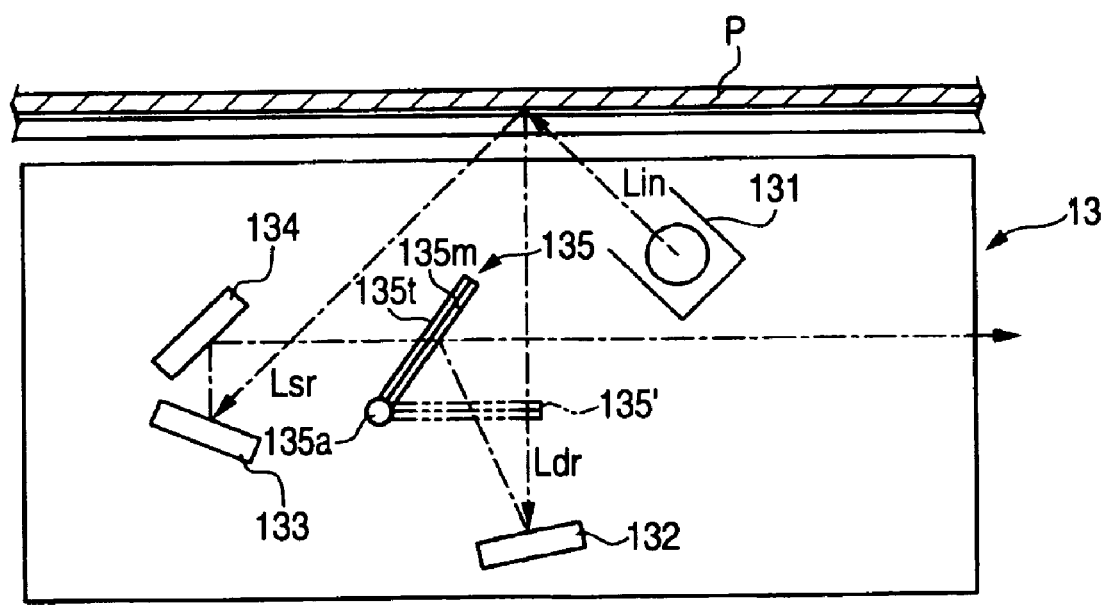
FIG. 2 is a view showing the configuration of a full rate carriage of the same embodiment.

FIG. 2 shows the configuration of the full rate carriage 13 of this embodiment. The full rate carriage 13 includes a light source 131, mirrors 132, 133, 134 and a rotatable reflector 135. The light source 131 is formed of, for example, a tungsten halogen lamp or a xenon fluorescent lamp and irradiates the original P with light. The mirrors 132, 133, 134 further reflect a reflection light from the original P and the refection light is led to the half rate carriage 14. The rotatable reflector 135 forms a mirror 135$m$ which reflects light on one surface thereof and a light trap 135$t$ which absorbs light on the other surface thereof. The light trap 135$t$ is formed of, for example, a black porous polyurethane sheet and most of the light incident on the light trap 135$t$ is trapped and absorbed by the surface of the light trap 135$t$.

When the rotatable reflector 135 exists at a position shown in FIG. 2, the rotatable reflector 135 reflects the light from the mirror 132 and leads the light to the half rate carriage 14 and, on the other hand, absorbs the light from the mirror 134. The rotatable reflector 135 is rotated around a shaft 135$a$ as an axis by a drive part not shown in the figure and is movable to a position indicated by a dotted line (135') in the figure. When the rotatable reflector 135 exists at such a position, the rotatable reflector 135 leads the light from the mirror 134 to the half rate carriage 14 and, on the other hand, absorbs light toward the mirror 132.

Here, the light reflected by the rotatable reflector 135 has an optical path thereof aligned with an optical path of the light reflected on the mirror 134. By adopting such a configuration, it is possible to receive two different kinds of reflection lights using the same light receiving unit (a linear image sensor 16).

Here, the reflection light which advances in the inside of the full rate carriage 13 is explained.

Figure 3:
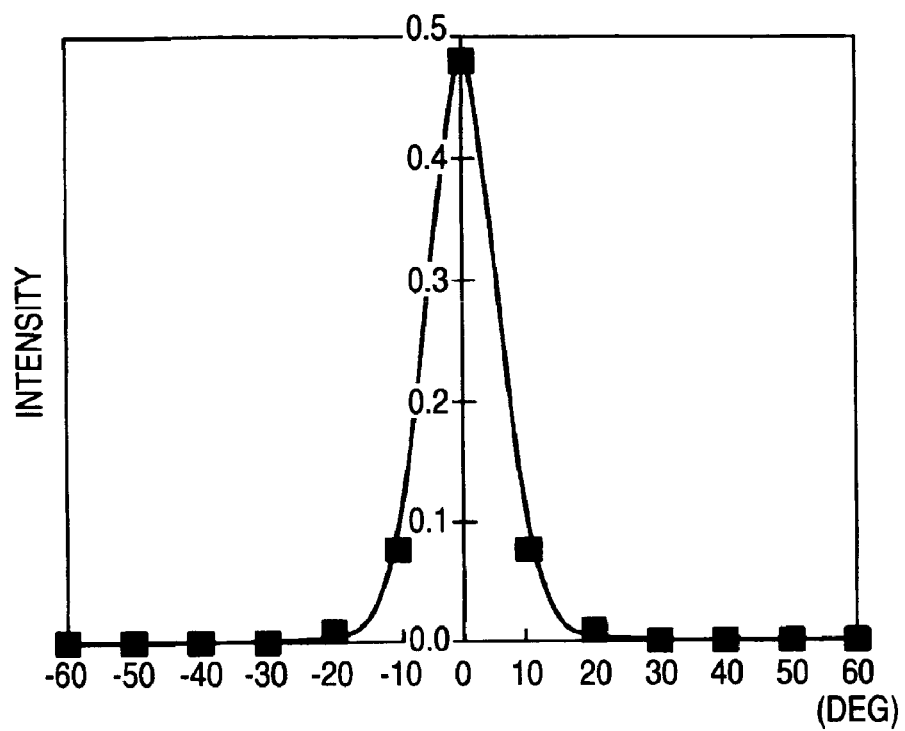
FIG. 3 is a view showing an example of the intensity distribution of a specular reflection light from an original P.

As described above, the specular reflection light has the high directivity and most of the specular reflection light is reflected substantially at the same angle with respect to an incident angle. FIG. 3 shows an example of the intensity distribution of the specular reflection light from the original P, where the displacement from the incident angle is taken on a horizontal axis (the intensity taken on a vertical axis being a non-dimensional quantity). To the contrary, the directivity of the diffuse reflection light is low and is reflected in all angles substantially uniformly.

Then, in the full rate carriage 13 of this embodiment, the incident angle of the light $L_{in}$ from the light source 131 is set to approximately 45°, the light $L_{sr}$ which is reflected at a reflection angle of approximately 45° with respect to the light $L_{in}$ is reflected on the mirror 133, and the light $L_{sr}$ is used as the reflection light (second reflection light) for reading the specular reflection light. Although the light $L_{sr}$ contains not only the specular reflection light but also the diffuse reflection light, components of the light $L_{sr}$ corresponding to the diffuse reflection light are offset by applying a given arithmetic calculation to an image signal generated after receiving the light. On the other hand, in the same manner as a usual image reader which reads only the color information, the diffuse reflection light is read based on the light $L_{dr}$ which is reflected at a reflection angle of approximately 0° with respect to the light $L_{in}$, and the light $L_{dr}$ is set as the reflection light (first reflection light) for reading the diffuse reflection light. That is, the reflection light $L_{sr}$ for reading the specular reflection light is reflected on the mirrors 133, 134 and the half rate carriage 14 and is focused as an image on the linear image sensor 16 by the imaging lens 15. Further, the reflection light $L_{dr}$ for reading the diffuse reflection light is reflected on the mirror 132, the rotatable reflector 135 and the half rate carriage 14 and is focused as an image on the linear image sensor 16 by the imaging lens 15.

Here, in the explanation made hereinafter, the reflection light $L_{dr}$ for reading the diffuse reflection light is referred to as "first reflection light" and the reflection light $L_{sr}$ for reading the specular reflection light is referred to as "second reflection light".

Further, in this embodiment, the mirrors and the rotatable reflector may be arranged as follows. That is, an optical path length (P-132-135-141) which leads the reflection light $L_{dr}$ from the original P to the half rate carriage 14 and an optical path length (P-133-134-141) which leads the reflection light $L_{sr}$ from the original P to the half rate carriage 14 become equal. In that case, even when the position of the rotatable reflector 135 is changed over, the focusing points of the imaging optical system are not changed. Due to such a configuration, since focusing positions are not changed with respect to each of the reflection light, it is unnecessary to adjust the focusing positions in reading the reflection lights.

The constitutional elements of the above-mentioned full rate carriage 13 are arranged in the direction perpendicular to a paper surface of FIG. 2 to have a width, as a whole, substantially equal to a width of the platen glass 11. Further, the full rate carriage 13 is moved in the direction indicated by an arrow C in FIG. 1 at a speed of v by a drive part not shown in the figure. By moving the full rate carriage 13 in the direction indicated by the arrow C with the actuation of the drive part, the full rate carriage 13 can scan a whole surface of the original P.

By reference to FIG. 1 again, the parts of the image reader 100 are explained hereinafter.

The half rate carriage 14 includes mirrors 141, 142 and leads the light from the full rate carriage 13 to the imaging lens 15. Further, the half rate carriage 14 is driven by a drive part not shown in the figure and is moved to the same direction as the moving direction of the full rate carriage 13 at a speed which is half of the speed of the full rate carriage 13 (that is, v/2).

The imaging lens 15 is arranged on an optical path which connects the mirror 142 and the linear image sensor 16 and forms an image of the light from the original P on a surface of the linear image sensor 16. The linear image sensor 16 is a light receiving element such as a 3-line color CCD (Charge Coupled Device) image sensor or the like which receives lights of three colors consisting of R (red), G (green) and B (blue), for example, in a separated manner and performs the photoelectric conversion of these lights thus generating and outputting image signals corresponding to received light quantity.

The operation part 17 includes a liquid crystal display, various button switches and the like and receives an input instruction from a user by displaying information for a user.

The operations of the above-mentioned respective parts are controlled by a control part not shown in the drawings. The control part includes an arithmetic operation device such as a CPU (Central Processing Unit) and various memories such as a ROM (Read Only Memory), a RAM (Random Access Memory) and the like. The control part supplies instructions to the above-mentioned drive parts in response to the instructions input by the user thus instructing the drive parts to perform the given operations to read an image. Further, the control part applies various image processing such as the AD conversion, the γ conversion, the shading correction to image signals output from the linear image sensor 16 thus forming image data. The image signals output from the linear image sensor 16 are composed of the image signal based on the second reflection light and the image signal based on the first reflection light. The control part performs given arithmetic operations using these image signals and generates image data containing information on texture. The arithmetic processing to offset the component corresponding to the diffuse reflection light from the above-mentioned second reflection light is performed at this stage of the overall operation.

With the above-mentioned configuration, the image reader 100 of this embodiment scans the whole surface of the original P by moving the full rate carriage 13 in the C direction and generates the image signals of the original P. In this embodiment, the image reader 100 performs the reading operation (scanning operation) of the original P twice and, in the reading operations, the image signals based on the reflection light $L_{dr}$ and the image signals based on the reflection light $L_{sr}$ are generated. In generating the image signals based on the reflection light $L_{dr}$, the control part moves the rotatable reflector 135 to the position shown in FIG. 2, while in generating the image signals based on the reflection light $L_{sr}$, the control part moves the rotatable reflector 135 to the position indicated by 135' in FIG. 2. Then, the control part obtains the gloss information from the image signals based on the reflection light $L_{sr}$ and superposes this gloss information on the color information obtained from image signals based on the reflection light $L_{dr}$.

Here, "gloss information" shows which region of the image data has the gloss (hereinafter referred to as "gloss region") and the degree of gloss of the gloss region. For example, "gloss information" indicates the level of gloss based on digital signals of 2 to 8 bits for RGB colors with respect to pixels of the corresponding image data. The data of each pixel assumes a value close to "black (R=0, G=0, B=0) corresponding to the decrease of the degree of gloss. The control part specifies the gloss region on the image data using this gloss information, obtains the level of gloss in the region and, thereafter, determines the color of the gloss region (for example, determination of gold, silver) and adds these information to the image data. Alternatively, the control part may specify the gloss region based on the digital signals of 2 to 8 bits of only G color with respect to the respective pixels thus generating the image data by merely adding the level of the gloss.

The image data obtained in this manner contains the information on the texture, that is, the texture information. With respect to such image data, by applying given processing to the gloss region in an image forming apparatus, for example, it is possible to generate an image which reproduces the texture of an object (original). The given processing to the gloss region, in case of an electrophotographic image forming device, for example, implies processing in which an image is formed on a paper using usual color toners of C (cyan), M (magenta), Y (yellow), K (black) and, thereafter, a transparent toner layer is formed on a gloss region and, finally, the image is fixed under high temperature and high pressure to give gloss to a surface of a formed image or processing in which a gold or silver metallic image is formed using toners of metallic colors such as gold, silver or the like.

Second Embodiment

Subsequently, the second exemplary embodiment of the present invention is explained. An image reader of this embodiment (hereinafter referred to as "image reader 200") differs from the above-mentioned image reader 100 of the first embodiment only with respect to the configuration of a full rate carriage. Accordingly, the explanation of only the configuration of the full rate carriage is made hereinafter and constitutional parts identical with the constitutional parts of the first embodiment are given the same numerals and their explanation is omitted.

Figure 4:
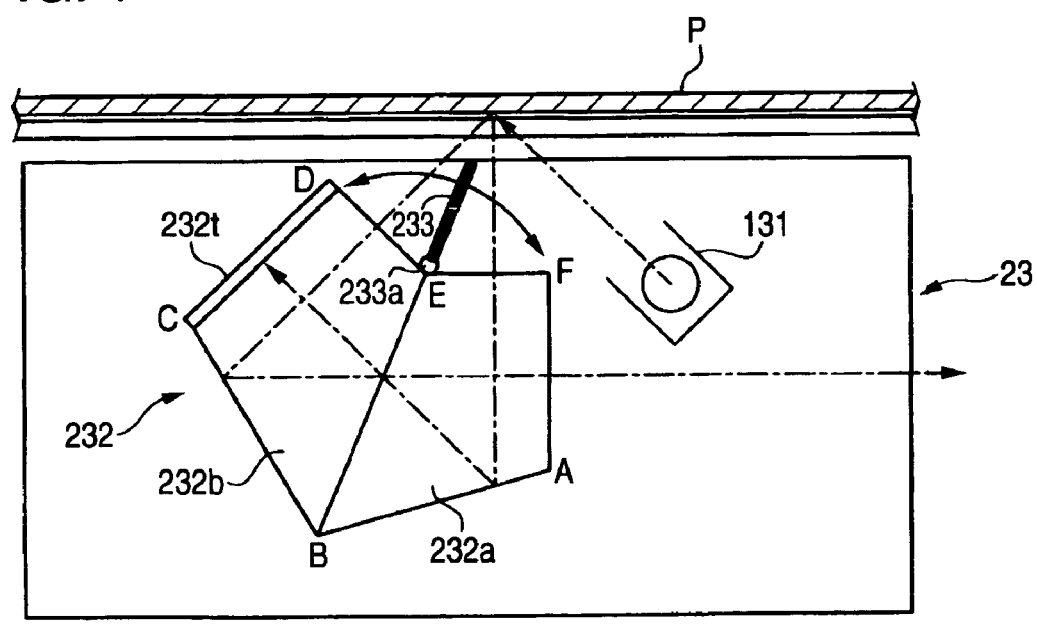
FIG. 4 is a view showing the configuration of the full rate carriage of a second exemplary embodiment of the present invention.

FIG. 4 shows the configuration of a full rate carriage 23 of this embodiment. As shown in the figure, the full rate carriage 23 includes a light source 131, a prism mirror 232 and a rotatable light trap 233.

The prism mirror 232 is a polygonal prism which is obtained by coating a mirror layer, a half mirror layer, an antireflection layer and the like on surfaces of plural prisms which are made of a glass material having a low refractive index and a low diffusion such as BK7 or the like made by SCHOTT AG, for example, and by adhering these layers using an optical adhesive material having a refractive index substantially equal to the glass material. The prism mirror 232 is disposed to cover the direction perpendicular to a paper surface in FIG. 4 with a width substantially equal to a width of a platen glass 11 and is formed by adhering a quadrangular-columnar glass material 232a which has apexes at cross sections A, B, E, F and a quadrangular-columnar glass material 232b which has apexes at cross sections, B, C, D, E along a surface BE using the optical adhesive agent. Further, for example, a thin aluminum layer is applied to a surface AB of the glass material 232a and a surface BC of the glass material 232b by a vapor deposition and these surfaces function as mirrors. The antireflection layer is formed on a surface CD of the glass material 232b and, further, a light trap member 232t formed of a black porous polyurethane sheet or the like is laminated to the surface CD thus allowing the surface CD to absorb the substantially whole light incident on the surface CD. The antireflection layer is formed on a surface DE of the glass material 232b and surfaces EF and FA of the glass material 232a in a state that an angle made by an optical axis of the incident light and each surface becomes 0°. Further, the half mirror (semitransparent mirror) layer is formed on the adhesive surface BE of the glass material 232a and the glass material 232b so as to reflect a portion of the incident light and to allow a portion of the incident light to transmit. The half mirror, due to the structure thereof, decreases the optical transmittance on the back side with the increase of the reflectance of the light on the front side. Accordingly, in designing the full rate carriage 23 of this embodiment, the half mirror which allows the reading of the respective reflection lights at a proper ratio may be suitably selected.

The rotatable light trap 233 has both surfaces thereof laminated with the above-mentioned light trap member and is rotated by a drive unit not shown in the figure using a shaft 233a as an axis. When the rotatable light trap 233 exists at a position along the surface EF of the prism mirror 232, the rotatable light trap 233 absorbs the diffuse reflection light from the original P, while when the rotatable light trap 233 exists at a position along the surface DE of the prism mirror 232, the rotatable light trap 233 absorbs the specular reflection light from the original P.

Here, also in this embodiment, an optical path length for reading the diffuse reflection light and an optical path length for reading the specular reflection light may be set equal. That is, assuming an optical path length along an optical axis to the surface EF of the prism mirror 232 from the original P as $l_{11}$, an optical path length along an optical axis to the surface FA from the surface EF of the prism mirror 232 as $l_{12}$, an optical path length along an optical axis to the surface DE of the prism mirror 232 from the original P as $l_{21}$, an optical path length of an optical axis to the surface FA from the surface DE of the prism mirror 232 as $l_{22}$, and a refractive index of the prism mirror as n, the relationship expressed by the following formula 1 may be satisfied.

$$l_{11} + nl_{12} = l_{21} + nl_{22} \quad \text{(formula 1)}$$

This relationship is satisfied by adopting the configuration in which cross-sectional shapes of the glass material 232a and the glass material 232b take a line symmetry with respect to an extension line of the surface BE.

With the use of the above-mentioned configuration, the image reader 200 of this embodiment can perform substantially the same operation as the image reader 100 of the first embodiment. In the image reader 200, in generating the image signal based on the first reflection light, the control part moves the rotatable light trap 233 to the position along the surface DE of the prism mirror 232, while in generating the image signal based on the second reflection light, the control part moves the rotatable light trap 233 to the position along the surface EF of the prism mirror 232.

Third Embodiment

Subsequently, the third exemplary embodiment of the present invention is explained. The image reader of this embodiment (hereinafter referred to as "image reader 300") differs from the image readers of the above-mentioned first and second embodiments with respect to a point that the first reflection light and the second reflection light can be read by a single scanning operation. Further, the image reader 300 of this embodiment also differs from the image reader 100 of the first embodiment only with respect the configuration of the full rate carriage and hence, the explanation of only the configuration of the full rate carriage is made hereinafter and constitutional parts identical with the constitutional parts of the first and second embodiments are given the same numerals and their explanation is omitted.

Figure 5:
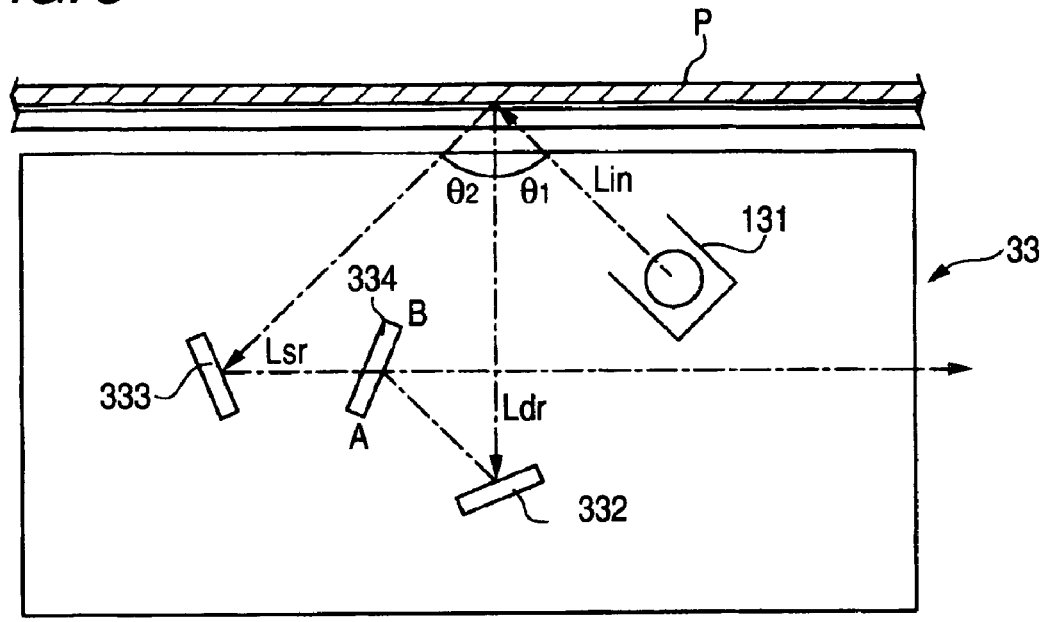
FIG. 5 is a view showing the configuration of the full rate carriage of a third exemplary embodiment of the present invention.

FIG. 5 is a view showing the configuration of the full rate carriage 33 in the embodiment. As shown in the figure, the full rate carriage 33 includes a light source 131, mirrors 332, 333 and a half mirror 334. The half mirror 334 reflects a portion of a reflection light $L_{dr}$ from the mirror 332 without allowing the reflection light $L_{dr}$ to transmit and allows a portion of a reflection light $L_{sr}$ to transmit without reflecting a portion of the reflection light $L_{sr}$ from the mirror 333.

In the image reader 300 of this embodiment, an optical path length along which the reflection light $L_{dr}$ from the original P is reflected on the mirror 332 and reaches a surface AB of the half mirror 334 and an optical path length along which the reflection light $L_{sr}$ from the original P is reflected on the mirror 333 and reaches the half mirror 334 are designed to become equal, and the reflection light $L_{dr}$ and the reflection light $L_{sr}$ are synthesized by the half mirror 334 and are output as a synthesized light. By allowing the full rate carriage 33 to have such a configuration, it is possible to simultaneously receive the diffuse reflection light and the specular reflection light which reflected from the same position of the original P. Accordingly, it is possible to easily form the image data having the texture information without performing the complicated arithmetic operation.

Here, an angle $\theta_2$ which the reflection light $L_{sr}$ incident on the mirror 333 makes with respect to a normal line of the original P may be set to a value which is different from an incident angle $\theta_1$ of the light $L_{in}$ from the light source 131 by ±5°. The reason is explained below.

Here, the explanation is made in conjunction with the above-mentioned FIG. 3. As shown in the figure, the specular reflection light usually possesses the strong directivity and a peak of the specular reflection light becomes steeper with the increase of degree of gloss of the surface. Accordingly, in using an object having a surface with the high degree of gloss as the original P, when the angle $\theta_2$ and the incident angle $\theta_1$ assume the relationship $\theta_2 = \theta_1$, there is a possibility that the intensity of the synthetic light received by the linear image sensor 16 exceeds a readable limit of the linear image sensor 16. In this case, the intensity of an image signal which is output from the linear image sensor 16 assumes a saturated value and hence, it is difficult to properly read the diffuse reflection light and the specular reflection light from such a signal. To prevent the intensity of signal output from the linear image sensor 16 from being saturated when the synthetic light is received, the mirror 333 may receive the reflection light $L_{sr}$ at an angle which makes the intensity of signal smaller than the maximum intensity to receive the synthetic light with the intensity which does not exceed the readable limit of the linear image sensor 16. By displacing the angle $\theta_2$ which the reflection light $L_{sr}$ makes with respect to a normal line of the original P from the incident angle $\theta_1$ of the light $L_{in}$ from the light source 131 by approximately ±5°, it is possible to make the intensity of the image signal attributed to the synthesized light smaller than the maximum intensity.

Due to such a configuration, the image reader 300 of this embodiment can read the first reflection light and the second reflection light by a single scanning operation and can obtain image data having texture information without increasing the scanning time of the original. For example, by performing the reading of the original in which only a specific region of the image possesses the strong gloss and the other regions possess the low gloss using the image reader 300 of this embodiment, it is possible to obtain the image signal in which only the above-mentioned specific region (gloss region) possesses the intensity higher than the intensities of other regions (non-gloss regions). The image data obtained from the image signal exhibits, in the above-mentioned gloss region, a color value which is larger than a maximum value of color value attributed to color information based on the first reflection light (that is, color value of "white"). Accordingly, by performing the determination of the gloss region with respect to the image data using the above-mentioned color value of "white" as a threshold value, it is possible to apply given processing to the gloss region. For example, in an electrophotographic image forming device, considered is an application in which, an image is formed on paper using usual color toners of C, M, Y, K with respect to the non-gloss region, while an metallic image is formed on the gloss region using metallic-color toner.

Alternatively, the image reader 300 of this embodiment is suitably applicable to a case in which a reflection condition of the specular reflection light from the surface of the original can be predicted to some extent such as a case in which, for example, the original is a printing paper having gloss or a case in which the original is a cloth having substantially no gloss.

Fourth Embodiment

Next, the fourth exemplary embodiment of the present invention is explained. The image reader of this embodiment (hereinafter referred to as "image reader 400") can read, in the same manner as the image reader 300 of the above-mentioned third embodiment, both of the first reflection light and the second reflection light by a single scanning operation.

The arrangement of mirrors and the like in the inside of the full rate carriage is not limited to those of the above-mentioned embodiments and various modifications are conceivable. The arrangement of this embodiment is directed to one example of these modifications.

Figure 6:
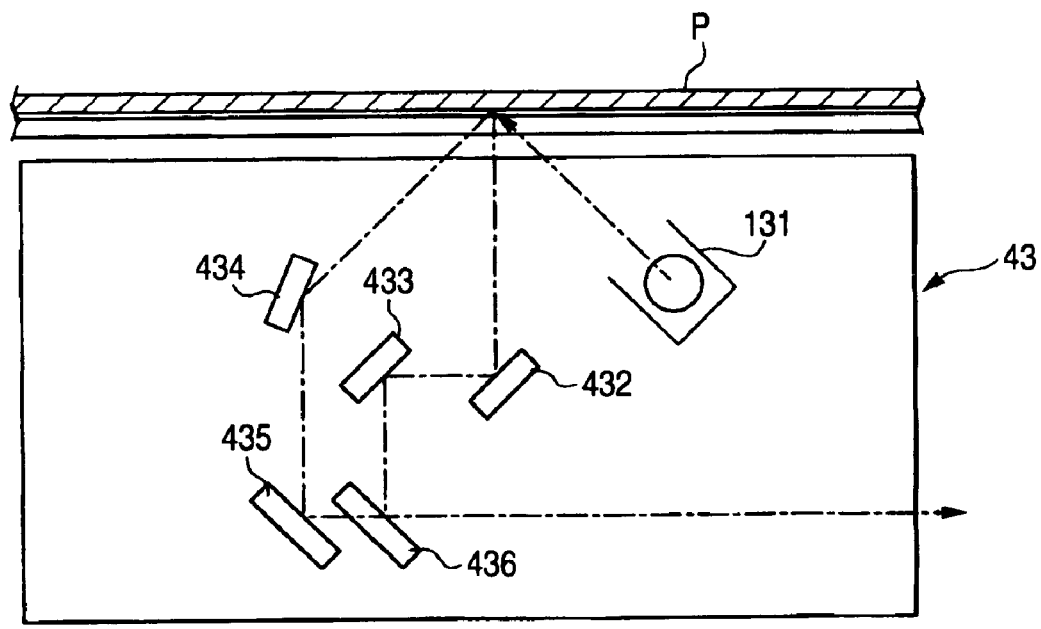
FIG. 6 is a view showing the configuration of the full rate carriage of a fourth exemplary embodiment of the present invention.

FIG. 6 shows the configuration of a full rate carriage 43 of the image reader 400 of this embodiment. As shown in the figure, the full rate carriage 43 includes a light source 131, mirrors 432, 433, 434, 435 and a half mirror 436. With such a configuration, a first reflection light (diffuse reflection light) is reflected on the mirrors 432, 433 and the half mirror 436 and is received by a line sensor 16, while a second reflection light (specular reflection light) is reflected on the mirrors 434 and 435, transmits the half mirror 436 and is received by the linear image sensor 16. Here, also in this case, it is necessary that an optical path length of the first reflection light is equal to an optical path length of the second reflection light.

Due to such a configuration, the image reader 400 can read both of the first reflection light and the second reflection light by a single scanning operation.

Here, as explained above in conjunction with the third embodiment, when the image reader 400 receives the first reflection light and the second reflection light simultaneously, it is necessary to prevent an image signal attributed to a synthesized light of the first reflection light and the second reflection light from being saturated. However, as has been explained in conjunction with the third embodiment, when the second reflection light is reflected on the mirror at the angle slightly larger or smaller than an angle which allows the acquisition of the maximum strength, there is a drawback that when an object having the low degree of gloss, that is, an object in which a rate of a specular reflection light component contained in the synthesized light is small is used as the original P, it is impossible to obtain the accurate texture information. Accordingly, the use of the above-mentioned method is limited to a case in which the degree of gloss of the original P can be preliminarily predicted to some extent.

As a countermeasure to address this drawback, a liquid crystal shutter, for example, can be applied. The liquid crystal shutter is a device which can change the transmittance of the light by controlling the applied voltage.

Figure 7:
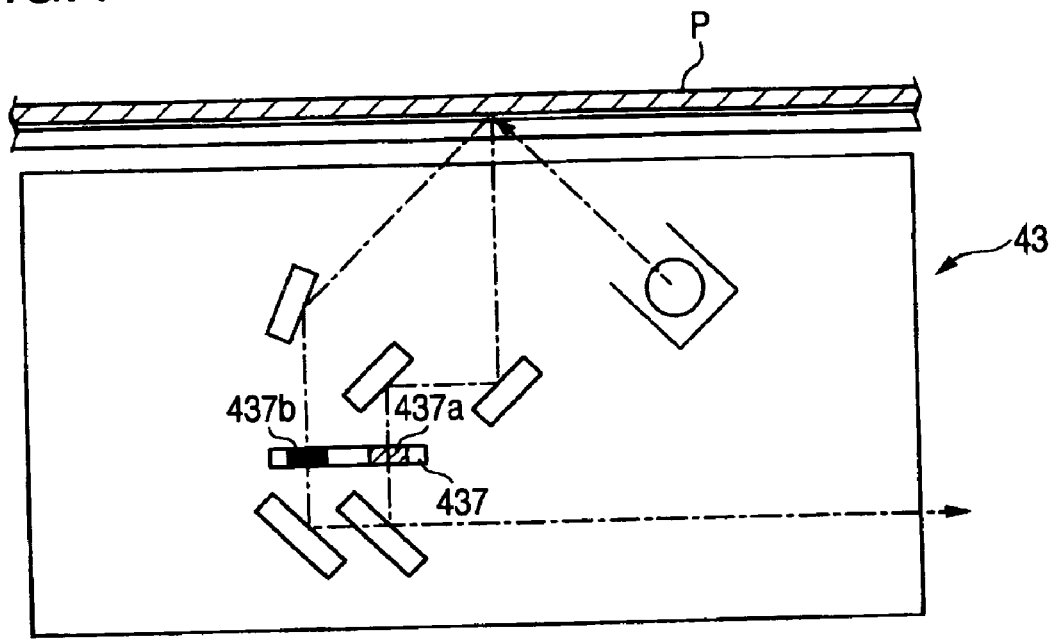
FIG. 7 is a view showing the configuration in which a liquid crystal shutter is mounted on the full rate carriage shown in FIG. 6.

FIG. 7 is a view showing an example of a configuration which provides a liquid crystal shutter 437 in the full rate carriage 43 shown in FIG. 6. In the figure, the first reflection light advances in a region 437a in the inside of the liquid crystal shutter 437, and the second reflection light advances in a region 437b in the inside of the liquid crystal shutter 437. In the liquid crystal shutter 437, the transmittance of the region 437a and the region 437b are independently controlled by applying different voltages.

Due to such a configuration, a user who operates the image reader 400, for example, can input an instruction to decrease the transmittance of the region 437b and increase the transmittance of the region 437a in performing the reading of the original P having the high degree of gloss, or can input an instruction to increase the transmittance of the region 437b and decrease the transmittance of the region 437a in performing the reading of the original P having the low degree of gloss.

Here, the above explanation has been made such that the liquid crystal shutter 437 can change the transmittance of each of the first reflection light and the second reflection light independently. However, the configuration which can change only the transmittance of the second reflection light can also obtain the advantageous effects to some extent. Further, the liquid crystal shutter is applicable to an image reader other than the image reader 400 of this embodiment.

Fifth Embodiment

Next, the fifth exemplary embodiment of the present invention is explained. According to the image reader of this embodiment (hereinafter referred to as "image reader 500") both of the first reflection light and the second reflection light can be read by a single scanning operation while having the configuration substantially equal to the configuration of the above-mentioned image reader 200 of the second embodiment.

Figure 8:
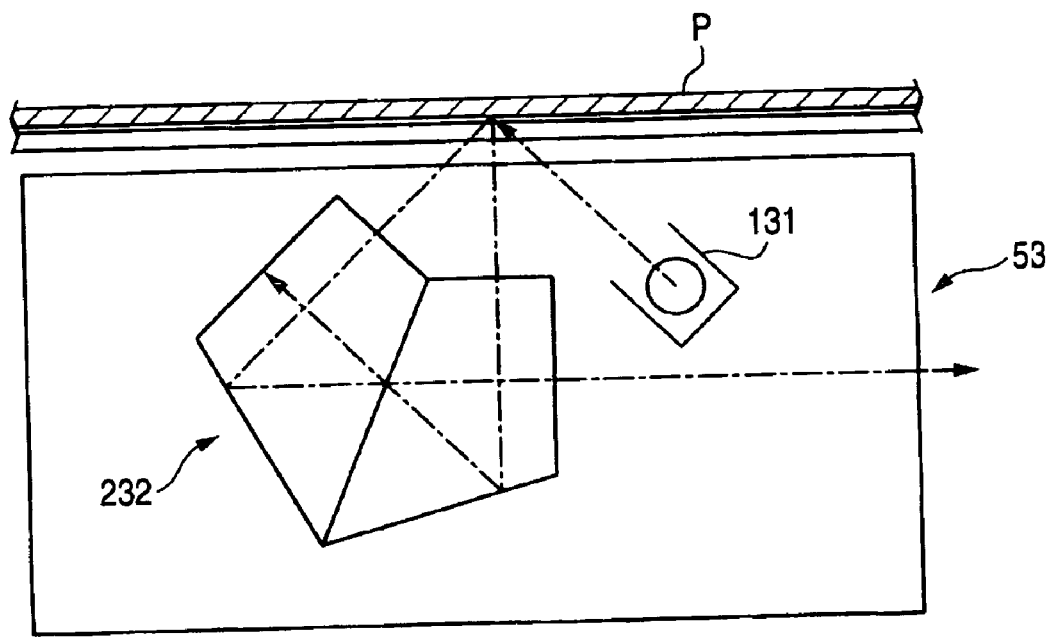
FIG. 8 is a view showing the configuration of the full rate carriage of a fifth exemplary embodiment of the present invention.

FIG. 8 shows the configuration of a full rate carriage 53 of this embodiment. The full rate carriage 53 includes, as shown in the figure, a light source 131 and a prism mirror 232. That is, the full rate carriage 53 of this embodiment is constituted by removing the rotatable light trap 233 from the full rate carriage 23 of the second embodiment. Here, in this embodiment, it is necessary that an optical path length of the first reflection light is equal to an optical path length of the second reflection light.

Due to such a configuration, the image reader 500 can, while having the configuration substantially equal to the configuration of the image reader 200 of the second embodiment, receive both of the first reflection light and the second reflection light reflected from the same position of the original P in the same manner as the image reader 300 of the third embodiment. Accordingly, it is possible to easily form the image data having the texture information without performing the complicated arithmetic operation.

Further, the full rate carriage 53 of the image reader 500 can be configured by merely removing the rotatable light trap 233 from the full rate carriage 23 of the second embodiment. That is, when the image reader 500 further includes the rotatable light trap 233, the image reader 500, in the same manner as the above-mentioned second embodiment, can receive the first reflection light and the second reflection light separately and, at the same time, can receive the synthesized light of the first reflection light and the second reflection light. Here, when the synthesized light of the first reflection light and the second reflection light is received, the rotatable light trap 233 may be arranged at a position where the rotatable light trap 233 interrupts neither the first reflection light nor the second reflection light.

Sixth Embodiment

Subsequently, the sixth exemplary embodiment of the present invention is explained. An image reader of this embodiment (hereinafter referred to as "image reader 600" of this embodiment) also adopts the substantially equal fundamental configuration and manner of operation as the image reader of the above-mentioned third embodiment. However, the image reader 600 of this embodiment differs from the image reader of the third embodiment with respect to the number of mirrors and the arrangement of mirrors. That is, this embodiment is characterized by the number of times that the first reflection light and the second reflection light are reflected on the mirrors.

Figure 9:
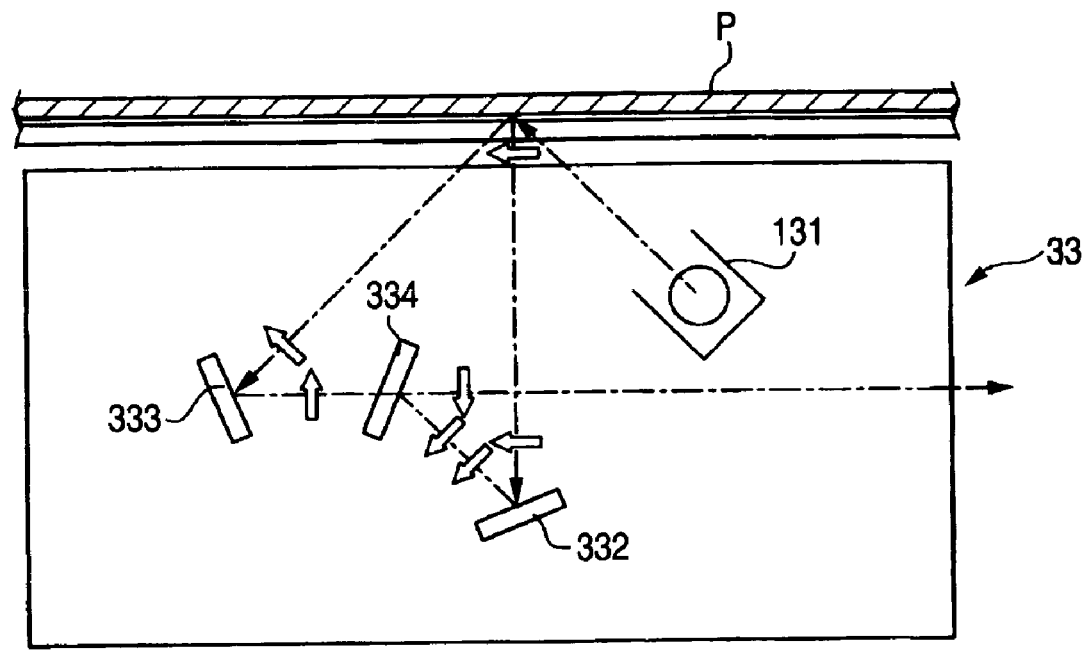
FIG. 9 is a view which schematically shows the directions of a first reflection light and a second reflection light which are focused to form images by a full rate carriage of the third exemplary embodiment.

FIG. 9 is a view which schematically shows the directions of reflections of the first reflection light and the second reflection light which are formed into images by the full rate carriage 33 of the third embodiment. In the figure, each arrow shown on optical paths indicates the vertical direction of the original P, where distal-end directions of the arrows imply the upward direction of the original P.

As shown in the figure, the first reflection light is reflected on the mirror 332 and on the half mirror 334, that is, twice in total and hence, when the first reflection light is output from the full rate carriage 33, the upper direction of the original P is directed downwardly. On the other hand, the second reflection light is reflected only once by the mirror 333 and hence, when the second reflection light is output from the full rate carriage 33, the upper direction of the original P is directed upwardly. That is, it is understood that the image directions of the first reflection light and the second reflection light are opposite. When two reflection lights are read simultaneously in such a condition, the resolution of an image formed on the linear image sensor 16 is degraded thus becoming a cause to lower the quality of the read image.

To make the image directions of the first reflection light and the second reflection light the same, the number of reflections of the first reflection light by the mirrors and the number of reflections of the second reflection light by the mirrors may be set equal to each other. For example, provided that both of the first reflection light and the second reflection light are reflected twice by the mirrors, when the first reflection light and the second reflection light are output from the full rate carriage, the upper direction of the original P is directed downwardly with respect to both of the first reflection light and the second reflection light and hence, the image directions become the same.

In the same manner, it is understood that even when the first reflection light is reflected on the mirrors three times and the second reflection light is reflected on the mirror once, the upper direction of the original P is directed upwardly with respect to both of the first reflection light and the second reflection light and hence, the respective image directions become the same. That is, it is understood that when both of the number of reflections of the first reflection light and the number of reflections of the second reflection light become either the even numbers or the odd numbers, the respective image directions become the same.

Here, in the above-mentioned explanation of the manner of operation, only the optical paths until the respective reflection lights are output from the full rate carriage are explained. However, in the actual manner of operation, it is necessary to determine whether the image direction become the same based on the number of reflections of the first reflection light which is generated from the original P until the first reflection light is received by the linear image sensor 16 and the number of reflections of the second reflection light which is generated from the original P until the second reflection light is received by the linear image sensor 16. However, the light which is output from the full rate carriage is the synthesized light of the first reflection light and the second reflection light and the optical paths are equal and hence, the numbers of reflections in the succeeding half-rate carriage are naturally equal. Accordingly, provided that the numbers of reflections of the first reflection light and the second reflection light until these reflection lights are output from the full rate carriage become the same, the number of reflections that the respective reflection lights make until the respective lights are received by the linear image sensor 16 also become the same.

In view of the above description, the full rate carriage of the image reader 600 of this embodiment is explained.

Figure 10:
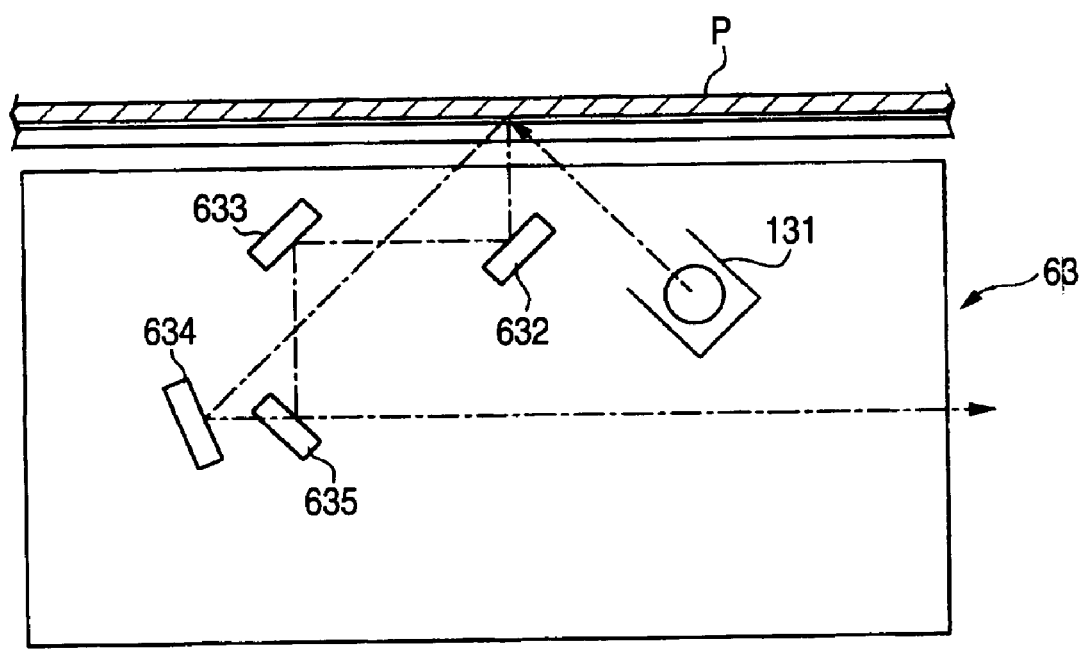
FIG. 10 is a view showing the configuration of the full rate carriage of a sixth exemplary embodiment of the present invention.

FIG. 10 is a view showing the configuration of a full rate carriage 63 of this exemplary embodiment. As shown in the figure, the full rate carriage 63 includes a light source 131, mirrors 632, 633, 634 and a half mirror 635. In this full rate carriage 63, the first reflection light is reflected on the mirrors 632, 633 and the half mirror 635 and hence, the number of reflections becomes three times in total. On the other hand, the second reflection light is reflected on the mirror 634 and hence, the number of reflections becomes once. That is, both of the number of reflections of the first reflection light and the number of reflections of the second reflection light are odd numbers and hence, it is understood that the image directions of the respective reflection lights received by the linear image sensor 16 become the same.

The optical system may be designed such that image directions of the first reflection light and the second reflection light become the same also in other embodiments, without limiting to this embodiment.

Seventh Embodiment

Subsequently, the seventh exemplary embodiment of the present invention is explained. Also in an image reader of this embodiment (hereinafter referred to as "image reader 700"), in the same manner as the above-mentioned image reader 600 of the embodiment 6, a first reflection light and a second reflection light which are received by a linear image sensor 16 have image directions thereof made to be the same. This embodiment shows a modification of the case in which the image direction of the first reflection light and the second reflection light become the same.

Figure 11:
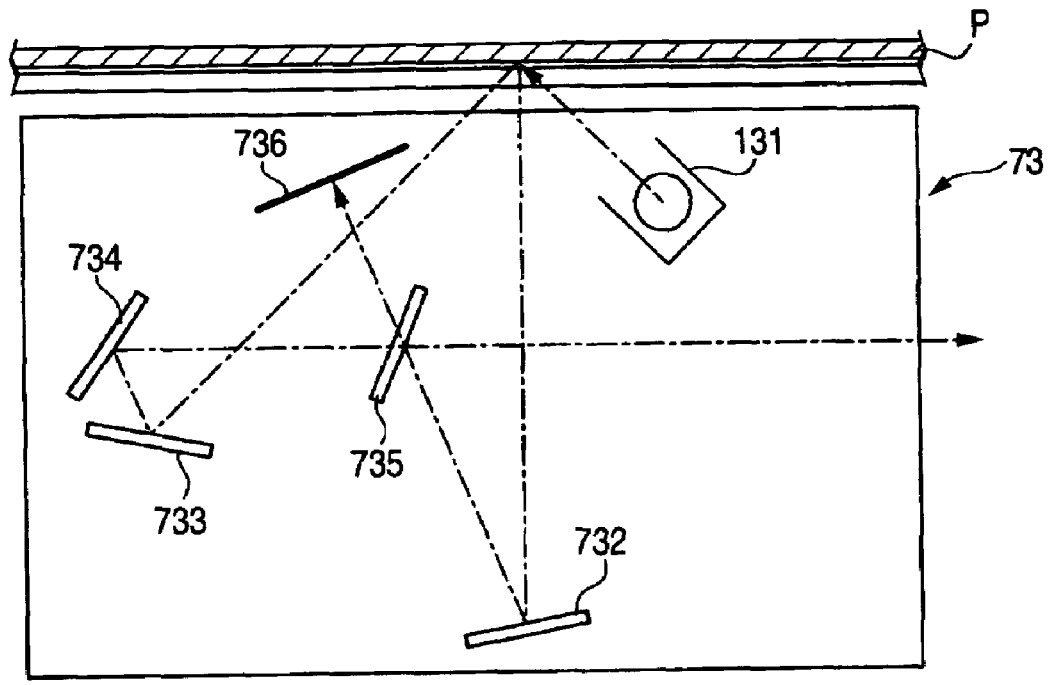
FIG. 11 is a view showing an example of the configuration of the full rate carriage of a seventh exemplary embodiment of the present invention.

FIG. 11 is a view showing one example of the configuration of a full rate carriage 73 of this embodiment. This full rate carriage 73 includes a light source 131, mirrors 732, 733, 734, a half mirror 735 and a light trap 736. In the full rate carriage 73, the first reflection light is reflected on the mirror 732 and the half mirror 735, while the second reflection light is reflected on the mirrors 733 and 734. That is, both of the numbers of times of reflections of respective reflection lights are twice, that is, the even numbers and hence, it is understood the image directions of the respective reflection lights received by the linear image sensor 16 become the same.

Here, in the same manner as the above-mentioned second embodiment, it is possible to provide the configuration which includes a prism mirror in place of the mirrors and the half mirror provided to the full rate carriage 73.

Figure 12:
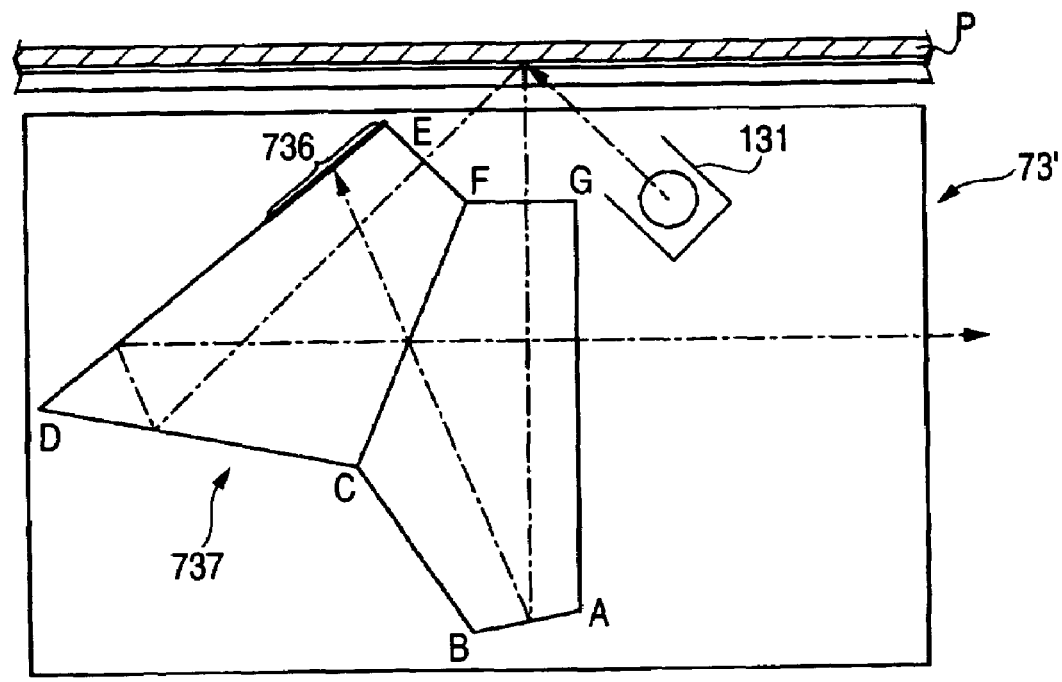
FIG. 12 is a view showing a full rate carriage of the exemplary embodiment including a prism mirror.

FIG. 12 is a view showing a full rate carriage 73' which includes the prism mirror in this embodiment. In the figure, the full rate carriage 73' includes a light source 131 and a prism mirror 737. A cross section of the prism mirror 737 is a heptagon having apexes A, B, C, D, E, F, G, wherein an aluminum thin film having a mirror function is vapor-deposited to surfaces AB, CD, DE. Further, a reflection preventing layer is formed on a portion corresponding to 736 in the figure of the surface DE and a light trap 736 is adhered to the portion. Due to the above-mentioned configuration, the full rate carriage 73' can obtain the substantially equal advantageous effects to the above-mentioned full rate carriage 73.

As described above, some aspects of the invention are outlined below.

According to an aspect of the invention, the image reader includes an illumination unit that irradiates an object to be read with light, a first optical system that allows a first reflection light from the object to be read advance therein, a second optical system that allows a second reflection light from the object to be read to advance therein, a switching unit that switches between the first optical system and the second optical system to be used, an imaging unit that forms an image of the first reflection light that advances in the first optical system and an image of the second reflection light that advances in the second optical system by switching between the first optical system and the second optical system by the switching unit, and a light receiving unit that receives the first reflection light and the second reflection light which are formed into images and generates respective image signals.

Such an image reader can generate the first reflection light from which the diffuse reflection light is read and the second reflection lights from which the specular reflection light is read based on the light irradiated from the same illumination unit, and the first reflection light and the second reflection light can be received by the same light receiving unit. Accordingly, the image reader can perform the reading of the texture information with the simpler configuration compared to the related art. Further, the image reader performs the reading operation twice and calculates the color information and the texture information based on two kinds of image information and hence, it is possible to obtain the color information and the texture information more accurately.

In the image reader, an optical path length of the first reflection light which advances through the first optical system until it is received by the light receiving unit and an optical path length of the second reflection light which advances through the second optical system until it is received by the light receiving unit may be set equal.

Due to such a configuration, there is no possibility of displacement between a focusing position of the first reflection light from which the diffuse reflection light is read and a focusing position of the second reflection light from which the specular reflection light is read and hence, it is unnecessary to provide a mechanism which adjusts the focusing position on the light receiving unit side.

According to another aspect of the present invention, an image reader includes an illumination unit that irradiates an object to be read with light, a first optical system that allows a first reflection light from the object to be read to advance therein, a second optical system that allows a second reflection light from the object to be read to advance therein, a reflection light synthesizing unit which outputs the first reflection light that advances in the first optical system and the second reflection light that advances in the second optical system as a synthesized light, an imaging unit which forms an image of the synthesized light output from the reflection light synthesizing unit, and a light receiving unit which receives the synthesized light which is formed into the image by the imaging unit and generates an image signal.

Such an image reader can generate the diffuse reflection light and the specular reflection light based on the light generated from the same illumination unit and the diffuse reflection light and the specular reflection light can be received by the same light receiving unit. Accordingly, the image reader can obtain the texture information with the simpler configuration compared to the related art. Further, the image reader can receive the synthesized light of the diffuse reflection light and the specular reflection light by a single reading operation and hence, the image reader can obtain the texture information more rapidly compared to the related art.

Here, in the above-mentioned aspects, the image reader may include a variable transmission unit which changes transmittance of the light on at least one of the optical paths for the first reflection light and the second reflection light.

Due to such a configuration, even when the intensity of the first or second reflection light from which the diffuse or specular reflection light is read is strong, it is possible to prevent the synthesized light from exceeding the reading limit, attributed to the saturation of a signal output of photoelectric converting element or the like which constitutes light receiving unit. Further, according to such a configuration, it is possible to arbitrarily adjust a light quantity ratio of the first reflection light and the second reflection light and hence, the degree of gloss can be adjusted thus allowing the inputting of information suitable for the reproduction of more desirable texture.

Further, in the above-mentioned aspects, both of the number of reflections of light until the first reflection light from the original is received by the light receiving unit and the number of reflections of light until the second reflection light from the original is received by the light receiving unit may be even numbers or odd numbers.

Due to such a configuration, it is possible to align the image direction of an image light obtained by the diffuse reflection light and the image direction of an image light obtained by the specular reflection light with each other and hence, it is possible to input the information on the original more accurately.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-316763 filed on Oct. 29, 2004 including specification, claims, drawings and abstract is incorporated herein by reference in its entirety.

What is claimed is:

1. An image reader comprising:
an illumination unit that irradiates an object to be read with light;
a first optical system that allows a first reflection light from the object to be read to advance therein;
a second optical system that allows a second reflection light from the object to be read to advance therein;
a switching unit that switches between the first optical system and the second optical system to be used;
an imaging unit that forms an image of the first reflection light that advances in the first optical system and an image of the second reflection light that advances in the second optical system by switching between the first optical system and the second optical system by the switching unit; and
a light receiving unit that receives the first reflection light and the second reflection light which are formed into images by the imaging unit and generates respective image signals;
wherein each of the first optical system and the second optical system comprises a surface of a prism.

2. The image reader according to claim 1, wherein the light receiving unit generates the respective image signals by reading a diffuse reflection light from the first reflection light and a specular reflection light from the second reflection light.

3. The image reader according to claim 1, wherein each of the first optical system and the second optical system includes a mirror.

4. The image reader according to claim 1, wherein each of the first optical system and the second optical system includes a mirror and a half mirror.

5. The image reader according to claim 1, wherein an optical path length along which the first reflection light advances in the first optical system until the first reflection light is received by the light receiving unit and an optical path length along which the second reflection light advances in the second optical system until the second reflection light is received by the light receiving unit are set equal to each other.

6. The image reader according to claim 1, wherein a variable transmission unit which changes the transmittance of light is provided to at least one of the optical paths of the first reflection light and the second reflection light.

7. The image reader according to claim 1, wherein both of the number of times that the first reflection light from the object to be read is reflected until the first reflection light is received by the light receiving unit and the number of times that the second reflection light from the object to be read is reflected until the second reflection light is received by the light receiving unit are set to even numbers or odd numbers.

8. The image reader according to claim 1, wherein the first reflection light makes a reflection angle of approximately 0° with respect to an incident angle of an irradiating light from the illumination unit, and the second reflection light makes a reflection angle of approximately 45° with respect to the incident angle of the irradiating light from the illumination unit.

9. The image reader according to claim 1, further comprising an outputting unit which outputs information based on the first reflection light and information based on the second reflection light using the image signal generated by the light receiving unit.

10. The image reader according to claim 9, wherein the outputting unit outputs color information based on the first reflection light and texture information based on the second reflection light using the image signal.

11. An image reader comprising:
an illumination unit that irradiates an object to be read with light;
a first optical system that allows a first reflection light from the object to be read to advance therein;
a second optical system that allows a second reflection light from the object to be read to advance therein;
a reflection light synthesizing unit which outputs the first reflection light that advances in the first optical system and the second reflection light that advances in the second optical system as a synthesized light;
an imaging unit which forms an image of the synthesized light output from the reflection light synthesizing unit; and
a light receiving unit which receives the synthesized light which is formed into the image by the imaging unit and generates an image signal;
wherein each of the first optical system, the second optical system and the reflection light synthesizing unit comprises a surface of a prism.

12. The image reader according to claim 11, wherein the reflection light synthesizing unit is arranged at a position where an optical path length of the first reflection light and an optical path length of the second reflection light become equal to each other.

13. The image reader according to claim 11, wherein the light receiving unit reads a diffuse reflection light from the first reflection light which constitutes the synthesized light and a specular reflection light from the second reflection light which constitutes the synthesized light and generates respective image signals.

14. The image reader according to claim 11, wherein each of the first optical system and the second optical system includes a mirror.

15. The image reader according to claim 11, wherein the reflection light synthesizing unit comprises a half mirror.

16. The image reader according to claim 11, wherein a variable transmission unit which changes the transmittance of the light is provided to at least one of the optical paths of the first reflection light and the second reflection light.

17. The image reader according to claim 11, wherein both of the number of times that the first reflection light from the object to be read is reflected until the first reflection light is received by the light receiving unit and the number of times that the second reflection light from the object to be read is reflected until the second reflection light is received by the light receiving unit are set to even numbers or odd numbers.

18. The image reader according to claim 11, wherein an angle that the first reflection light and the second reflection light make differs from an angle which light from the illumination unit and the first reflection light make by approximately ±5°.

19. The image reader according to claim 11, further comprising an outputting unit which output information based on the first reflection light which constitutes the synthesized light and information based on the second reflection light which constitutes the synthesized light using the image signal generated by the light receiving unit.

20. The image reader according to claim 19, wherein the outputting unit outputs color information based on the first reflection light which constitutes the synthesized light and texture information based on the second reflection light which constitutes the synthesized light using the image signal.

* * * * *